US010239175B2

(12) United States Patent
Toyooka et al.

(10) Patent No.: US 10,239,175 B2
(45) Date of Patent: Mar. 26, 2019

(54) VERTICAL MACHINING CENTER

(71) Applicant: Sugino Machine Limited, Uozu, Toyama prefecture (JP)

(72) Inventors: Yuji Toyooka, Uozu (JP); Yoshitaka Ikeda, Uozu (JP); Satoru Hasegawa, Uozu (JP)

(73) Assignee: SUGINO MACHINE LIMITED, Uozu, Toyama (JP)

( * ) Notice: Subject to any disclaimer, the term of this patent is extended or adjusted under 35 U.S.C. 154(b) by 322 days.

(21) Appl. No.: 15/159,298

(22) Filed: May 19, 2016

(65) Prior Publication Data

US 2017/0106484 A1    Apr. 20, 2017

(30) Foreign Application Priority Data

Oct. 16, 2015   (JP) ................................. 2015-204522

(51) Int. Cl.
    *B23Q 11/08*       (2006.01)
    *B23Q 3/157*       (2006.01)

(52) U.S. Cl.
    CPC ...... *B23Q 11/0891* (2013.01); *B23Q 3/15773* (2013.01); *B23Q 11/0825* (2013.01); *B23Q 11/0875* (2013.01); *Y10T 483/115* (2015.01)

(58) Field of Classification Search
    CPC . B23Q 11/08; B23Q 11/0825; B23Q 11/0875; B23Q 11/0891; B23Q 3/155–3/15793
    See application file for complete search history.

(56) References Cited

U.S. PATENT DOCUMENTS

| 4,742,609 A | * | 5/1988 | Neumann | ................ | B23Q 1/01 29/26 A |
| 6,082,939 A | * | 7/2000 | Nakashima | .............. | B23Q 1/58 409/134 |

(Continued)

FOREIGN PATENT DOCUMENTS

CN      203944903 U    11/2014
CN      104999336 A    10/2015
(Continued)

OTHER PUBLICATIONS

JP 2006123045 English Translation.*
(Continued)

*Primary Examiner* — Daniel Howell
*Assistant Examiner* — Yasir Diab
(74) *Attorney, Agent, or Firm* — Merchant & Gould P.C.

(57) ABSTRACT

Provided is a vertical machining center including: a splash cover fixed to a base, the splash cover defining a machining chamber to enclose a machining zone; a column vertically standing on the base; a Z-axis guiding rail disposed on the column and being vertically directed toward the base, the Z-axis guiding rail partially exposed to the machining zone; a Z-axis driving device disposed in the column, the Z-axis driving device partially exposed to the machining zone; a spindle head to be driven vertically by the Z-axis driving device; a spindle head opening formed in the splash cover so that the spindle head can pass through the spindle head opening; and an extendable cover provided between an edge of the spindle head opening and the spindle head and configured to cover parts of the Z-axis guiding rail and the Z-axis driving device, the parts being exposed to the machining zone.

6 Claims, 5 Drawing Sheets

(56) References Cited

U.S. PATENT DOCUMENTS

| | | | | |
|---|---|---|---|---|
| 7,226,403 B2* | 6/2007 | Konvicka | ............... | B23Q 1/012 |
| | | | | 198/346.1 |
| 7,229,395 B2* | 6/2007 | Yoshida | ............. | B23Q 11/0891 |
| | | | | 483/3 |
| 2002/0028118 A1* | 3/2002 | Laur | ........................ | B23Q 1/70 |
| | | | | 409/132 |
| 2003/0185641 A1* | 10/2003 | Tanigawa | ............. | B23Q 1/0009 |
| | | | | 409/134 |
| 2006/0269375 A1* | 11/2006 | Takayama | .......... | B23Q 11/0816 |
| | | | | 409/134 |
| 2008/0080941 A1 | 4/2008 | Prust et al. | | |
| 2009/0053004 A1* | 2/2009 | Yamaura | ................ | B23Q 1/623 |
| | | | | 409/165 |
| 2010/0145498 A1* | 6/2010 | Uchikawa | .......... | B23Q 3/15733 |
| | | | | 700/179 |

FOREIGN PATENT DOCUMENTS

| | | | | | |
|---|---|---|---|---|---|
| EP | 1900476 A1 | | 3/2008 | | |
| JP | 09309044 A | * | 12/1997 | | |
| JP | 2002-103174 A | | 4/2002 | | |
| JP | 2006-123045 A | | 5/2006 | | |
| JP | 2010099810 A | * | 5/2010 | ......... | B23Q 3/15766 |

OTHER PUBLICATIONS

Sugino Machine Limited Company Catalog—Self-Center No. 30 Series (Cat. No. M2344NE), Sep. 2015, 3 pages.
EP Search Report for European Patent Application No. 16170614.8 (dated Mar. 17, 2017).
Dffice Action for Japanese Patent Application No. 2015-204522, dated Dec. 4, 2018.

* cited by examiner

VERTICAL MACHINING CENTER

CROSS REFERENCE TO RELATED APPLICATIONS

This application claims the foreign priority benefit under Title 35, United States Code, 119 (a)-(d) of Japanese Patent Application No. 2015-204522, filed on Oct. 16, 2015 in the Japan Patent Office, the disclosure of which is herein incorporated by reference in its entirety.

BACKGROUND OF THE INVENTION

1. Technical Field

The present invention relates to a vertical machining center.

2. Description of Background Art

Conventionally, there is known a vertical machining center which rotatably supports a spindle, moves the spindle in a vertical direction (Z direction) in a machining zone, and moves a work table in front-rear and left-right directions. For example, refer to the following non-patent literature 1.

The vertical machining center disclosed in the non-patent literature 1 has, on a column standing on a bed, a Z-axis guiding mechanism to vertically guide a spindle head and a Z-axis driving device to move the spindle head The bed is surrounded with a splash cover. Various hoses through which coolant, lubricating oil and pressurized air pass, and electric cables are connected to the spindle head from above, and then are hung in the machining zone. Furthermore, thin cables like signal wires are inserted in a flexible duct (flexible protecting tube), and are disposed to be hung together with the flexible protecting tube.

Non-patent document 1: NSV15 type Machining Center on page 9, in "self-center (TM) No. 30 series catalog", published in September, 2015 by Sugino Machine Limited

BRIEF SUMMARY OF THE INVENTION

However, in the vertical machining center disclosed in the non-patent document 1, chips, oil, coolant, and the like adhere to the hoses and the electric cables which are hung, so that they have to be shaken down from the hoses and the electric cables at the time of maintenance. In addition, there has been a problem of bad workability for exchanging cables or the like inserted in the flexible protecting tube.

The present invention has been created in view of such a technical background. It is an object of the present invention to provide a vertical machining center which separates a machining zone from a non-machining zone to prevent coolant dispersion to the non-machining zone, thereby operability and maintainability are improved. The non-machining zone consists of all zones except the machining zone, that is, the non-machining zone includes a driving device zone having the Z-axis guiding mechanism, Z-axis driving device, an auto tool changer, hoses, electric cables, control unit and the like.

To solve the above problems, one aspect of the present invention provides a vertical machining center including:

a base;

a splash cover fixed to the base, the splash cover defining a machining chamber to enclose a machining zone;

a column fixed to the base and vertically standing on the base;

a Z-axis guiding rail disposed on the column and being vertically directed toward the base, the Z-axis guiding rail being partially exposed to the machining zone;

a Z-axis driving device disposed in the column, the Z-axis driving device being partially exposed to the machining zone;

a spindle head to be guided by the Z-axis guiding rail and to be driven vertically by the Z-axis driving device;

a spindle head opening formed in the splash cover so that the spindle head can pass through the spindle head opening; and an extendable cover provided between an edge of the spindle head opening and the spindle head and configured to cover parts of the Z-axis guiding rail and the Z-axis driving device, the parts being exposed to the machining zone.

The machining center according to the one aspect of the present invention has the splash cover defining the machining chamber to surround the machining zone. So the machining zone can be firmly separated from the non-machining zone. Therefore, chips and/or coolant in the machining zone can be restrained from being scattered to enter the non-machining zone, so that operability and maintainability can be improved.

BRIEF DESCRIPTION OF THE SEVERAL VIEWS OF THE DRAWINGS

Certain embodiments of the present invention will now be described in greater detail, byway of example only, and with reference to the attached drawings, in which.

DETAILED DESCRIPTION OF THE INVENTION

A vertical machining center 1 according to an embodiment of the present invention will be described in detail appropriately with reference to FIGS. 1 to 5.

Figure 1:
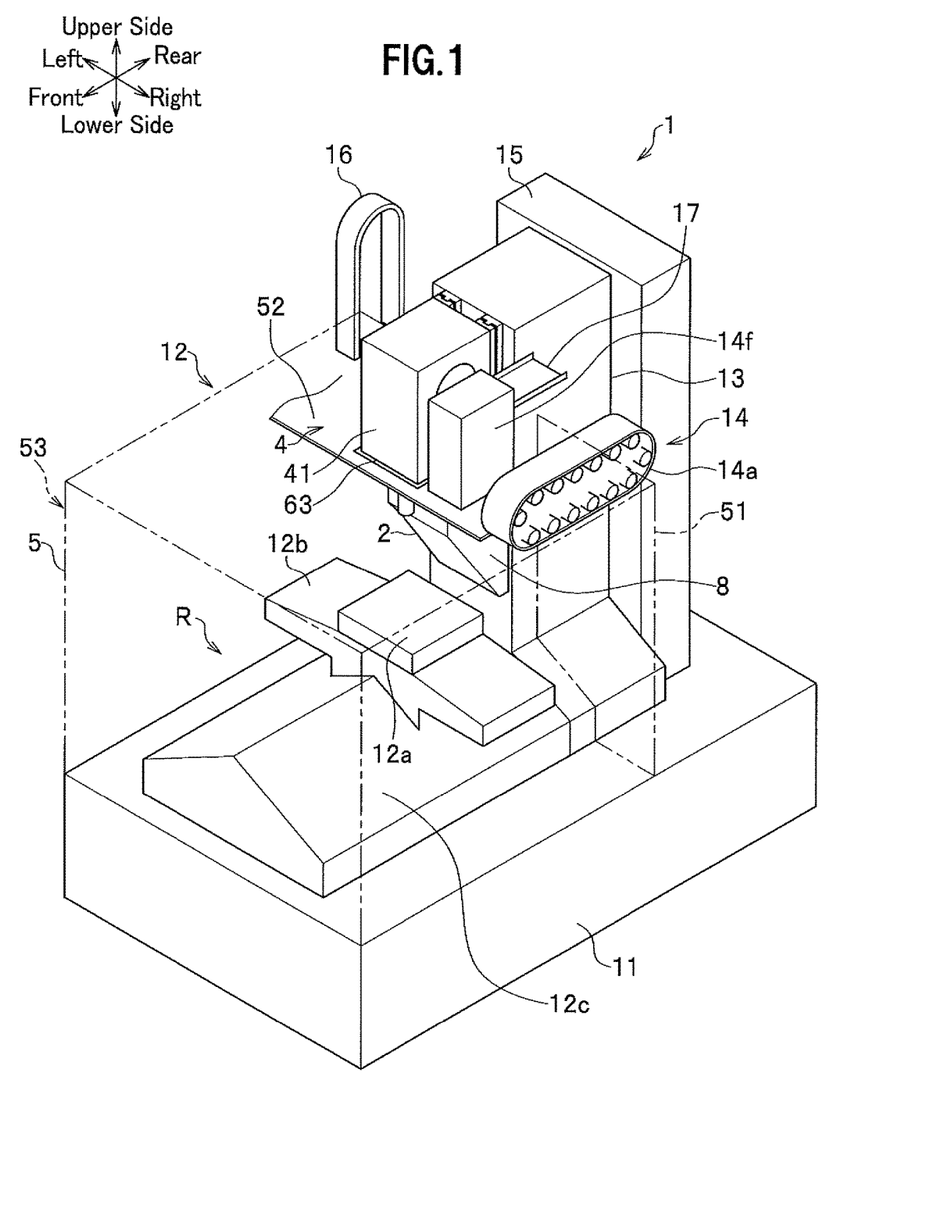
FIG. 1 is a perspective view showing the constitution of a vertical machining center according to an embodiment of the present invention.

As shown in FIG. 1, the vertical machining center 1 has a base 11, a machining chamber 12, a column 13, Z-axis guiding rails 2 (refer to FIGS. 3A, 5), a Z-axis driving device 3 (refer to FIG. 3A), a recessed part 13a (refer to FIG. 3A), a spindle head 4, a splash cover 5, a spindle head opening 6 (refer to FIGS. 3A, 3B), and an extendable cover 8. The base 11 serves as a base. The machining chamber 12 is disposed on the base 11. The column 13 is vertically standing on the base 11. The Z-axis guiding rails 2 are disposed on the column 13 and are vertically directed toward the base 11. The Z-axis driving device 3 is housed in the recessed part 13a of the column 13. The recessed part 13a is formed in the column 13 and houses the Z-axis driving device 3 therein. The spindle head 4 is covered with a spindle head cover 41, guided on the Z-axis guiding rails 2 and driven vertically by the Z-axis driving device 3. The splash cover 5 defines the machining chamber 12 to surround a machining zone R, and is fixed to the base 11. The spindle head opening 6 is formed in the splash cover 5 so that the spindle head 4 can pass through the spindle head opening 6 and the Z-axis guiding rails 2 and the Z-axis driving device 3 are partially exposed to the machining zone R. The extendable cover 8 is formed between an edge of the spindle head opening 6 and the spindle head 4 (that is, between the column 13 and the spindle head 4) and configured to cover parts of the Z-axis guiding rails 2 and the Z-axis driving device 3 which are exposed to the machining zone R.

Furthermore, the vertical machining center 1 is provided with an auto tool changer 14, a control unit 15 disposed behind the column 13, a cable protection tube 16 like Cable Bear (Registered Trademark) and a cable rack 17 disposed above the machining chamber 12. With use of the cable protection tube 16 and the cable rack 17, pipes like tubes or hoses, and/or cables are capable of being altogether disposed in a non-machining zone.

In the machining chamber 12, there are disposed a work table 12a on which a workpiece (not shown) is placed, an X-axis driving device 12b for moving the work table 12a in an X-axis (left-right) direction, and a Y-axis driving device 12c for moving the X-axis driving device 12b in a Y-axis (front-rear) direction. The machining zone R does not include the insides of the X-axis driving device 12b and the Y-axis driving device 12c. The contents of the X-axis driving device 12b and the Y-axis driving device 12c are enclosed with respective covers as shown in FIG. 1.

The machining chamber 12 is covered with the splash cover 5 to cover the machining zone R, and is provided with an openable door (not shown) disposed at the front of the splash cover 5.

The splash cover 5 has a back side cover 51, an upper side cover 52, and a peripheral cover 53. The back side cover 51 is disposed on the back side of the machining zone R. The upper side cover 52 is joined to the back side cover 51 and disposed on the upper side of the machining zone R. The peripheral cover 53 is joined to the back side cover 51 and the upper side cover 52, and surrounds the periphery of the machining zone R to have a U-shape or E-shape without a horizontal middle line segment of "E" in plan view.

Figure 3A:
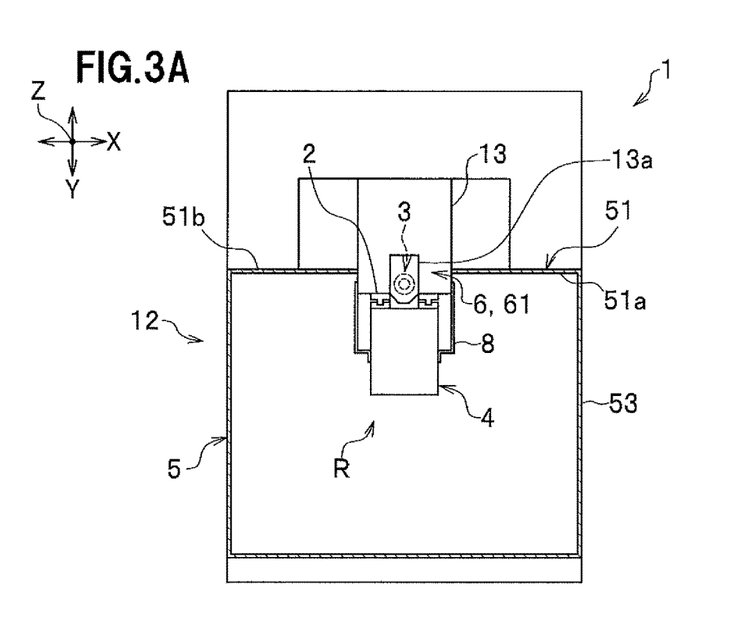
FIG. 3A is a plan view showing an attached state of an extendable cover of the vertical machining center according to the embodiment of the present invention.
Figure 3B:
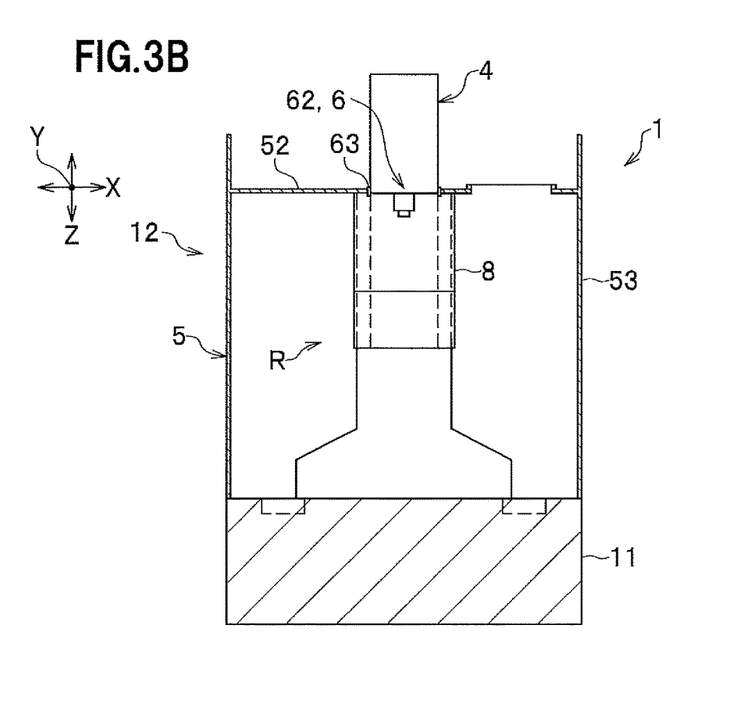
FIG. 3B is a front view showing the attached state of the extendable cover of the vertical machining center according to the embodiment of the present invention.

The back side cover 51 has a right back cover 51a and a left back cover 51b formed in lateral symmetry with each other as shown in FIGS. 3A and 3B.

The right back cover 51a is disposed so as to connect a right side surface of the column 13 and a right side rear edge of the peripheral cover 53. The left back cover 51b is disposed so as to connect a left side surface of the column 13 and a left side rear edge of the peripheral cover 53. The right back cover 51a and/or the left back cover 51b may be joined to an expanse surface zone or expanse surface zones of the peripheral cover 53. That is, one or both of the right side rear edge and the left side rear edge of the peripheral cover 53 may be positioned on the rear side of the back side cover 51.

The spindle head opening 6 has a back opening 61 (refer to also FIG. 5) formed in the back side cover 51 as shown in FIG. 3A, and also has an upper opening 62 formed in the upper side cover 52 as shown in FIG. 3B.

As shown in FIGS. 3A and 3B, the spindle head opening 6 is formed so that a part of the spindle head 4 appears outside through the upper opening 62 formed in the upper side cover 52 and the Z-axis guiding rails 2 and the Z-axis driving device 3 are exposed through the back opening 61 formed in the back side cover 51.

That is, a part of the spindle head 4 is at least placed outside through the upper opening 62. And the back opening 61 is a gap between the right back cover 51a and the left back cover 51b. The column 13 is disposed at the back opening 61. In other words, the column 13 serves as a part of the back side cover 51.

A scraper 63 is disposed at a gap between the spindle head cover 41 and the upper side cover 52 of the splash cover 5. The scraper 63 scrapes away chips and/or coolant or the like adhering to the spindle head cover 41 to prevent them from entering the non-machining zone.

As shown in FIG. 3A, the Z-axis driving device 3 is a device for moving the spindle head 4 movable vertically along the Z-axis guiding rails 2, and can be constituted by a ball screw and a driving motor (not shown). As the constitution of the Z-axis driving device 3 is not specifically limited, a detailed explanation is omitted.

The extendable cover 8 is a telescopic cover, whose moving end is attached to the spindle head 4, and whose fixing end is attached to the column 13.

Figure 5:
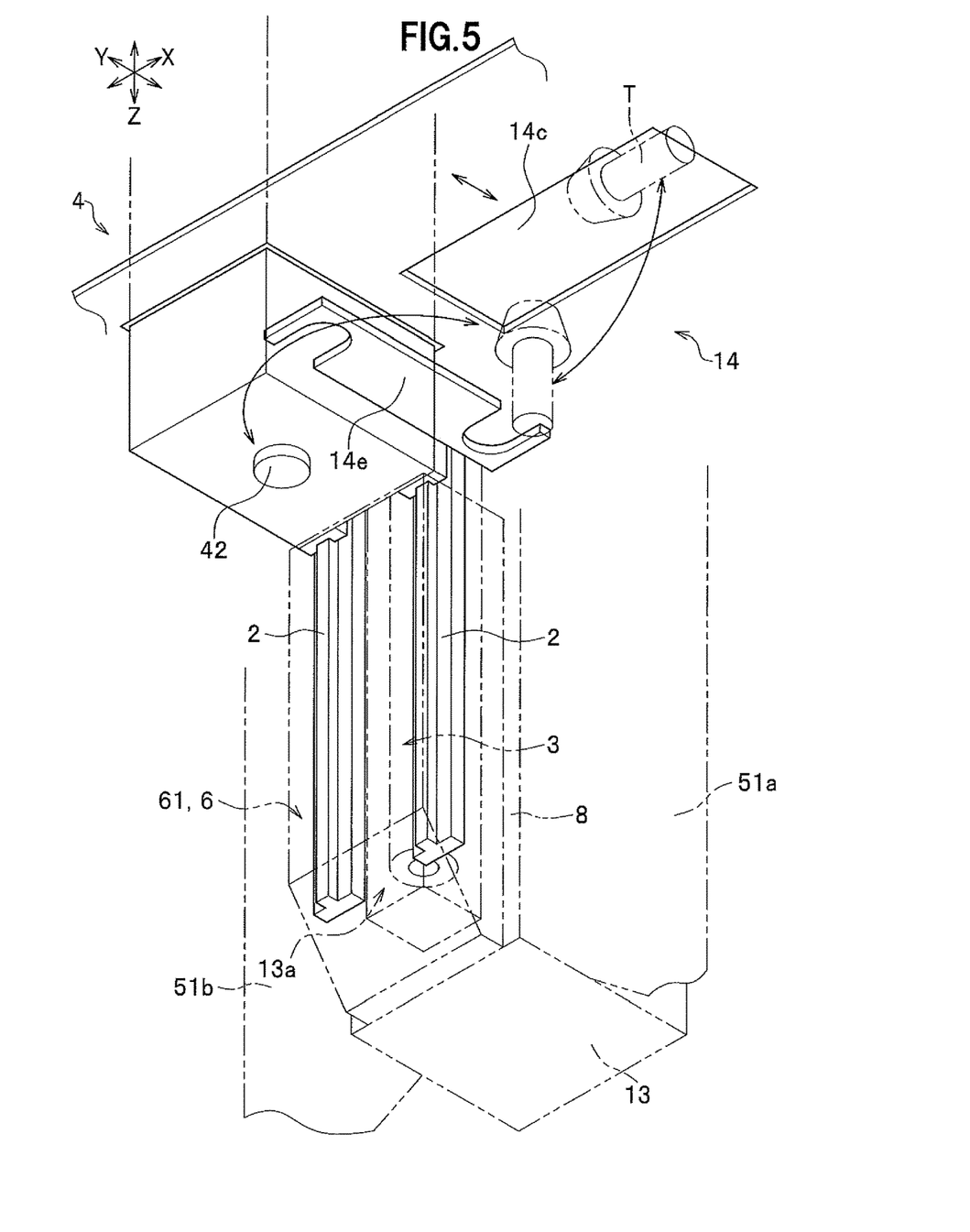
FIG. 5 is an enlarged partial perspective view showing a state of exchanging tools in the vertical machining center according to the embodiment of the present invention.

As shown in FIG. 5, the extendable cover 8 is disposed to overlap the back opening 61 in a state of covering the Z-axis guiding rails 2 and the Z-axis driving device 3 disposed in the recessed part 13a in the column 13.

Figure 2:
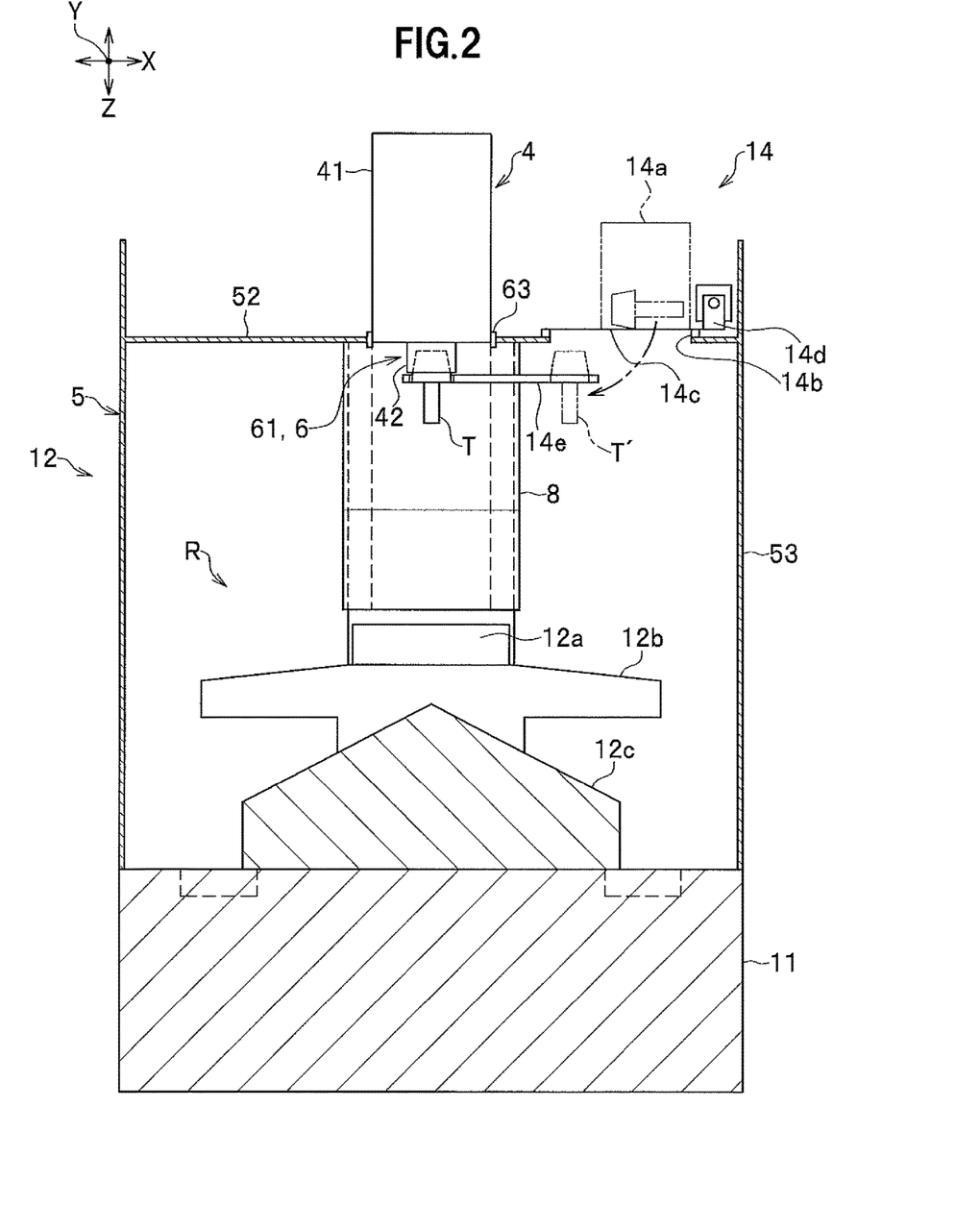
FIG. 2 is a front view showing the constitution of the vertical machining center according to the embodiment of the present invention.

As shown in FIG. 2, the auto tool changer 14 has a tool magazine 14a, a tool change opening 14b, a shutter 14c, a driving cylinder mechanism 14d, a driving device 14f, and a tool change arm 14e (refer to also FIG. 5). The tool magazine 14a houses tools T. The tool change opening 14b is formed in the upper side cover 52, through which opening 14b one of the tools housed in the tool magazine 14a is transferred to or from a tool change position T' (a position shown by a two-dotted chain line parallel to a spindle 42) in the machining chamber 12. The shutter 14c can close and open the tool change opening 14b. The driving cylinder mechanism 14d closes and opens the shutter 14c. The moving mechanism moves a tool housed in the tool magazine 14a to the tool change position T'. The tool change arm 14e transfers a tool between the tool change position T' and the spindle 42 by rotation thereof.

According to the above-mentioned structure, the tool magazine 14a and driving devices including the driving cylinder mechanism 14d and the Z-axis driving device 3 are disposed outside the machining chamber 12, so chips and/or coolant are prevented from adhering to them, so that maintainability can be improved. Furthermore, since the tool change arm 14e is disposed in the machining chamber 12, tools can be rapidly exchanged.

Figure 4:
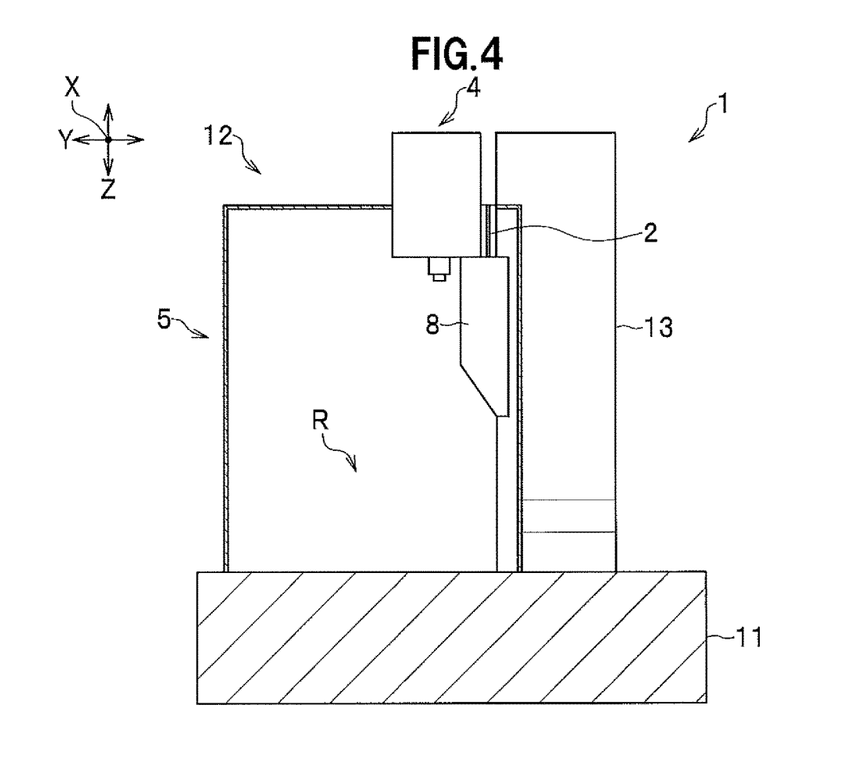
FIG. 4 is a side view showing the attached state of the extendable cover of the vertical machining center according to the embodiment of the present invention.

Operations of the vertical machining center 1 according to the embodiment of the present invention constituted as mentioned above will be explained mainly with reference to FIGS. 1 and 4.

Since the vertical machining center 1 has the splash cover 5 defining the machining chamber 12 so as to enclose the machining zone R, the machining zone R and the non-machining zone (especially, a region above the upper side cover 52 and a region behind the extendable cover 8 and the back side cover 51, in which regions a driving source and a driving mechanism are disposed) can be strictly separated from each other. Thereby, chips and/or coolant in the machining zone R can be restrained from scattering to enter the non-machining zone. Accordingly, operability and maintainability can be improved.

Since the spindle head opening 6 is formed in the splash cover 5 and only a lower part of the spindle head 4 is entered the machining zone R through the spindle head opening 6, pipes like tubes or hoses, and/or cables, which are connected to the spindle head 4, are capable of being together disposed in the non-machining zone. That is, the non-machining zone in the present invention includes also the inside of the cable protection tube 16. Therefore, chips and/or coolant can be prevented from adhering to the pipes and/or the cables. So the spindle head 4 and the non-machining zone can be kept clean, so that operability and maintainability can be further improved.

The splash cover 5 has: the back side cover 51 disposed on the backside of the machining zone R; the upper side cover 52 disposed on the upper side of the machining zone R, the upper side cover 52 being joined to the back side cover 51; and the peripheral cover 53 surrounding a periphery of the machining zone R, the peripheral cover 53 being joined to the back side cover 51 and the upper side cover 52. And the spindle head opening 6 is configured so that the spindle head 4 can pass through the upper side cover 52, and that the Z-axis guiding rail 2 and the Z-axis driving device 3 are exposed to the machining zone through the back side cover 51.

According to this constitution, the spindle head opening 6 is an opening continuously opened from the upper side cover 52 to the back side cover 51. Therefore, the spindle head opening 6 can be surely covered by the extendable cover 8. That is, driving mechanisms like the Z-axis guiding rail 2 and the Z-axis driving device 3 can be restrained from adhering of chips and/or coolant thereto.

Apart of the back side cover 51 is formed by the column 13; another part 51a of the back side cover 51 is joined to a side surface of the column 13 and also joined to an edge of the peripheral cover 53; and the other part 51b of the back side cover 51 is joined to the other side surface of the column 13 and also joined to the other edge of the peripheral cover 53. The column 13 has the recessed part 13a to house the Z-axis driving device 3.

According to this constitution, a part of the back side cover 51 is formed by the column 13, and the Z-axis driving device 3 is housed in the recessed part 13a provided in the column 13. Therefore, the constitution of the back side cover 51 is simplified, so that shielding performance of the machining chamber 12 can be improved.

The extendable cover 8 is a telescopic cover whose moving end is attached to the spindle head cover 41 and whose fixing end is attached to the column 13.

The vertical machining center 1 includes a spindle head cover 41 to cover a pipe and/or a cable connected to the spindle head 4; and the scraper 63 disposed in the spindle head opening 6, the scraper 63 being configured to scrape a gap between the spindle head cover 41 and the splash cover 5.

According to this constitution, the spindle head cover 41, which covers a pipe and/or a cable connected to the spindle head 4, is provided. Therefore, the pipe and/or the cable are restrained from being damaged and maintainability thereof can be improved. Furthermore, the scraper 63, which is configured to scrape a gap between the spindle head cover 41 and the splash cover 5, is provided, so that chips and/or coolant can be effectively prevented from entering a non-machining zone.

The vertical machining center 1 includes the auto tool changer 14 having the tool magazine 14a, the driving device 14f, and the tool change arm 14e, the tool magazine 14a and the driving device 14f being disposed outside the machining chamber 12, and the tool change arm 14e being disposed inside the machining chamber 12; the tool change opening 14b disposed in the splash cover 5, through the tool change opening, a tool housed in the tool magazine 14a being transferred to or from the tool change position T' in the machining chamber 12; and the shutter 14c capable of closing and opening the tool change opening 14b.

In the above, the embodiment of the present invention has been explained. The present invention is not limited to the embodiment and can be carried out with a properly modified embodiment. For example, in the present embodiment, in order to improve a space efficiency of the machining zone R, the back side cover 51 is constituted by the right back cover 51a and the left back cover 51b, and the column 13 is disposed at the gap (corresponding to the back opening 61) between the right back cover 51a and the left back cover 51b.

DESCRIPTION OF REFERENCE NUMERALS

1 Vertical machining center
2 Z-axis guiding rail
3 Z-axis driving device
4 Spindle head
5 Splash cover
6 Spindle head opening
8 Extendable cover
11 Base
12 Machining chamber
13 Column
13a Recessed part
14 Auto tool changer
14a Tool magazine
14b Tool change opening
14c Shutter
14d Driving cylinder mechanism
14e Tool change arm
15 Control unit
16 Cable protection tube
17 Cable rack
41 Spindle head cover
42 Spindle
51 Back side cover
51a Right back cover
51b Left back cover
52 Upper side cover
53 Peripheral cover
61 Back opening
62 Upper opening
63 Scraper
R Machining zone
T Tool

What is claimed is:

1. A vertical machining center comprising:
   a base;
   a splash cover fixed to the base, the splash cover defining a machining chamber to enclose a machining zone and to separate from a non-machining zone, the splash cover including:
      a peripheral cover surrounding the machining zone,
      an upper side cover disposed on an upper side of the machining zone, the upper side cover being joined to the peripheral cover,
      a back side cover disposed on a back side of the machining zone; the back side cover having a right back cover and a left back cover;
   a column fixed to the base and vertically standing on the base, the column having a recessed part and being positioned between the right back cover and the left back cover, the column having a right side surface to which a left end part of the right back cover is joined, and a left side surface to which a right end part of the left back cover is joined, a right end part of the right back cover being joined to a right end part of the peripheral cover, a left end part of the left back cover being joined to a left end part of the peripheral cover, the right back cover and the left back cover being joined to the upper side cover;

a Z-axis guiding rail disposed on the column and being vertically directed toward the base, the Z-axis guiding rail being partially exposed to the machining zone;

a Z-axis driving device disposed in the recessed part of the column, the Z-axis driving device being partially exposed to the machining zone;

a spindle head to be guided by the Z-axis guiding rail and to be driven vertically by the Z-axis driving device;

a spindle head opening formed in the upper side cover of the splash cover so that the spindle head can pass through the spindle head opening; and an extendable cover provided between an edge of the spindle head opening and the spindle head, the extendable cover being configured to cover parts of the Z-axis guiding rail and the Z-axis driving device, the parts being exposed to the machining zone in a case where the extendable cover does not cover the parts.

2. The vertical machining center according to claim 1, wherein the extendable cover is a telescopic cover, a moving end of the extendable cover being attached to the spindle head, and a fixing end of the extendable cover being attached to the column.

3. The vertical machining center according to claim 1, further comprising:
   a spindle head cover configured to cover a pipe and/or a cable connected to the spindle head; and
   a scraper disposed in the spindle head opening, the scraper being configured to scrape a gap between the spindle head cover and the splash cover.

4. The vertical machining center according to claim 2, further comprising:
   a spindle head cover configured to cover a pipe and/or a cable connected to the spindle head; and
   a scraper disposed in the spindle head opening, the scraper being configured to scrape a gap between the spindle head cover and the upper side cover.

5. The vertical machining center according to claim 1, further comprising:
   an auto tool changer including a tool magazine, a driving device, and a tool change arm, the tool magazine and the driving device being disposed outside the machining chamber, and the tool change arm being disposed inside the machining chamber;
   a tool change opening disposed in the splash cover, through the tool change opening, a tool housed in the tool magazine being transferred to or from a tool change position in the machining chamber; and
   a shutter capable of closing and opening the tool change opening.

6. The vertical machining center according to claim 2, further comprising:
   an auto tool changer including a tool magazine, a driving device, and a tool change arm, the tool magazine and the driving device being disposed outside the machining chamber, and the tool change arm being disposed inside the machining chamber;
   a tool change opening disposed in the splash cover, through the tool change opening, a tool housed in the tool magazine being transferred to or from a tool change position in the machining chamber; and
   a shutter capable of closing and opening the tool change opening.

* * * * *